UNITED STATES PATENT OFFICE.

JEAN MARIE DANIELLI, OF PARIS, FRANCE.

IMITATION WHITE AND COLORED MARBLE.

SPECIFICATION forming part of Letters Patent No. 412,021, dated October 1, 1889.

Application filed April 12, 1888. Renewed March 27, 1889. Serial No. 305,021. (No specimens.)

*To all whom it may concern:*

Be it known that I, JEAN MARIE DANIELLI, a citizen of the Republic of France, residing at Paris, in the Province of Seine, and in the country of France, have invented certain new and useful Improvements in Imitation of White and Colored Marbles; and I do hereby declare that the following is a full, clear, and exact description thereof.

My invention relates to a process for making imitation stone—such as marble—of any shade or color.

My invention consists of mixing various kinds of compounds and then baking them until they shall have become sufficiently hard, all of which will be described hereinafter.

In order to carry out my invention, I shall first divide it into formulas, then explain the process of mixing the same farther on.

*Formula A.*—Water, one liter; sulphate of aluminum and potash, one hundred grams. Then add albumen, sixty grams; and alcohol, sixty grams. Then mix well and add green color, one hundred grams. Stir well and add to the mixture a white powder and reduce it to the consistency of paste.

*Formula B.*—Prussian blue, one hundred grams; oxalic acid, twenty grams. Add to this water, one liter. Stir well and dissolve.

*Formula C.*—Dissolve extract of campach, fifty grams, and bichromate of potash, ten grams, in water, one liter.

*Formula D.*—Essence of turpentine, one hundred grams; virgin wax, thirty grams. While hot and liquid add essence of lavender, six grams. Then stir until cool, until it reaches the consistency of pomade. After the mill shall have been greased with vaseline, then soap over with silice, two parts; vere-pile or green color, one part; oxide of zinc, one part. Then put in the mixture described in formula A. Then add the mixtures described in formulas B, C, and D for veins. Then subject the whole to 80° centigrade until perfect cohesion. Then put it in a bath of vaseline for thirty minutes in heat. Then remove it for ten minutes. Then replunge it into bath of paraffine 80° centigrade, where it is left for a time, which will depend upon the thickness of the slab, and then take it out and remove all matter or burrs that may be clinging thereto.

Preparatory to carbonization for colored marbles the special colors should be added before final bath.

Having thus described my invention, what I claim as new, and desire to secure by Letters Patent, is—

The process for making imitation marbles and other stones by first mixing sulphate aluminum, albumen, alcohol, wax, coloring substance, acids, and potash, and forming the whole into a plastic state, then subjecting it to baths of vaseline and paraffine, and finally carbonizing it, substantially as herein set forth.

In testimony that I claim the foregoing, I have hereunto set my hand this 2d day of August, 1887.

JEAN MARIE DANIELLI.

Witnesses:
ROBT. M. HOOPER,
ARTHUR GOOD.